(12) United States Patent
Mani et al.

(10) Patent No.: US 10,009,477 B2
(45) Date of Patent: Jun. 26, 2018

(54) PURE DELAY ESTIMATION

(71) Applicant: Imagination Technologies Limited, Kings Langley (GB)

(72) Inventors: Senthil Kumar Mani, Hyderabad (IN); Sowmya Mannava, Hyderabad (IN)

(73) Assignee: Imagination Technologies Limited, Kings Langley (GB)

( * ) Notice: Subject to any disclaimer, the term of this patent is extended or adjusted under 35 U.S.C. 154(b) by 266 days.

(21) Appl. No.: 14/934,856

(22) Filed: Nov. 6, 2015

(65) Prior Publication Data
US 2016/0134759 A1  May 12, 2016

(30) Foreign Application Priority Data
Nov. 6, 2014  (GB) .................................. 1419785.9

(51) Int. Cl.
*H04M 9/08* (2006.01)
*H04B 3/23* (2006.01)

(52) U.S. Cl.
CPC ............ *H04M 9/082* (2013.01); *H04B 3/235* (2013.01); *H04B 3/237* (2013.01)

(58) Field of Classification Search
CPC .......... H04B 3/23; H04B 3/235; H04B 3/237; H04M 9/08; H04M 9/082
See application file for complete search history.

(56) References Cited

U.S. PATENT DOCUMENTS

| | | | | |
|---|---|---|---|---|
| 5,263,020 A | * | 11/1993 | Yatsuzuka | H04B 3/237 370/289 |
| 5,307,405 A | * | 4/1994 | Sih | G10L 19/012 370/290 |

(Continued)

FOREIGN PATENT DOCUMENTS

| | | | | |
|---|---|---|---|---|
| EP | 0743773 A2 | * | 11/1996 | ............ H04J 3/0632 |
| EP | 2493167 A1 | | 8/2012 | |

OTHER PUBLICATIONS

Sugiyama et al. "A Fast Convergence Algorithm for Sparse-Tap Adaptive FIR Filters Identifying an Unknown Number of Dispersive Regions" IEEE Transactions on Signal Processing, vol. 50, No. 12, Dec. 2002, pp. 3008-3017.

(Continued)

*Primary Examiner* — Lisa Hashem
(74) *Attorney, Agent, or Firm* — Vorys, Sater, Seymour and Pease LLP; Vincent M DeLuca

(57) ABSTRACT

A system for estimating delay between a far-end signal and an echo of the far-end signal in a microphone signal, the system comprising: a buffer configured to store a time-series of far-end samples representing the far-end signal; a first delay estimator configured to form a first estimate of the delay in respect of a speech frame representing speech in the microphone signal; a second delay estimator configured to form a second estimate of the delay for the speech frame by operating a first set of one or more filters on far-end samples selected from the buffer in dependence on an operating delay; a second set of one or more filters for operation on far-end samples; and a controller configured to, in response to a determination that the first estimate of the delay for the speech frame differs from the operating delay for a previous frame by at least a predefined length of time, cause the one or more filters of the second set to operate on far-end samples selected from the buffer according to the first estimate of the delay and, if in respect of one or more speech frames a measure of convergence of the second set of filters exceeds a measure of convergence of the first set of filters by at least a first predefined threshold, update the operating delay using the first estimate of the delay.

20 Claims, 5 Drawing Sheets

(56) References Cited

U.S. PATENT DOCUMENTS

| | | | | |
|---|---|---|---|---|
| 5,610,909 A * | 3/1997 | Shaw | .................... | H04M 9/082 |
| | | | | 370/291 |
| 6,625,279 B1 | 9/2003 | Eom | | |
| 6,804,203 B1 * | 10/2004 | Benyassine | ........... | H04M 9/082 |
| | | | | 370/286 |
| 7,742,916 B2 * | 6/2010 | Barriac | .................. | G10L 25/69 |
| | | | | 370/395.21 |
| 7,949,520 B2 * | 5/2011 | Nongpiur | ............. | G06Q 20/108 |
| | | | | 375/240 |
| 2003/0231763 A1 * | 12/2003 | Lilliott | ..................... | H04B 3/23 |
| | | | | 379/406.01 |
| 2004/0151303 A1 * | 8/2004 | Park | ..................... | H04M 9/082 |
| | | | | 379/406.01 |
| 2004/0252652 A1 * | 12/2004 | Berestesky | .............. | H04B 3/23 |
| | | | | 370/286 |
| 2005/0094622 A1 * | 5/2005 | Mallila | ................. | H04J 3/0632 |
| | | | | 370/352 |
| 2009/0106021 A1 * | 4/2009 | Zurek | ................. | G10L 21/0208 |
| | | | | 704/226 |
| 2013/0163698 A1 | 6/2013 | Volcker et al. | | |
| 2015/0181017 A1 * | 6/2015 | Mani | ..................... | H04M 3/002 |
| | | | | 379/406.08 |
| 2015/0181018 A1 * | 6/2015 | Mani | ..................... | H04M 3/002 |
| | | | | 379/406.08 |
| 2017/0118326 A1 * | 4/2017 | Mani | ..................... | H04M 3/002 |
| 2017/0208170 A1 * | 7/2017 | Mani | ..................... | H04M 3/002 |

OTHER PUBLICATIONS

Sukkar "Echo Detection and Delay Estimation Using a Pattern Recogntion Approach and Cepstral Correlation", ICASSP 2007, pp. IV-909-IV-912.

Govil "Enhanced Residual Echo Cancellation using Estimation of Delay and Fast LMS/Newton Algorithm based on Autoregressive Model" 2006 IEEE, p. 1356.

Dyba "Parallel Structures for Fast Estimation of Echo Path Pure Delay and Their Applications to Sparse Echo Cancellers" 2008 IEEE., pp. 241-245.

Lu et al., "Enhancing Echo Cancellation via Estimation of Delay," IEEE Transactions on Signal Processing, vol. 53, No. 11, Nov. 2005.

Lu et al., "Enhancing Echo Cancellation via Estimation of Delay," IEEE Transactions on Signal Processing, vol. 53, No. 11, pp. 4159-4168 Nov. 2005.

* cited by examiner

PURE DELAY ESTIMATION

BACKGROUND OF THE INVENTION

This invention relates to a system and method for estimating delay at a communication device.

In telephony, audio signals (e.g. including voice signals) are transmitted between a near-end and a far-end. Far-end signals which are received at the near-end may be outputted from a loudspeaker. A microphone at the near-end may be used to capture a near-end signal to be transmitted to the far-end. An "echo" occurs when at least some of the far-end signal outputted at the near-end is included in the microphone signal which is transmitted back to the far-end. In this sense the echo may be considered to be a reflection of the far-end signal. An example scenario is illustrated in FIG. 1, which shows a signal being captured by a far-end microphone and output by a near-end loudspeaker. The echo is a consequence of acoustic coupling between the loudspeaker and a microphone at the near-end; the near-end microphone captures the signal originating from its own loudspeaker in addition to the voice of the near-end speaker and any near-end background noise. The result is an echo at the far-end loudspeaker.

Echo cancellation is an important feature of telephony. Echo cancellers typically synthesise an estimate of the echo from the far-end voice signal. The estimated echo is then subtracted from the microphone signal.

In Voice over IP (VoIP) communication systems, echoes can be especially noticeable due to the inherent delays introduced by the audio interfaces of VoIP communication devices. Audio interface delays at a communication device lead to a characteristically sparse echo path. An echo path is "sparse" if a large fraction of the energy of the impulse response describing the echo path is concentrated in a small fraction of its duration. To model a sparse echo path, simple echo cancellers require large sample buffers and long filters, but this can lead to reduced performance in terms of convergence speed and depth. In order to improve the performance of echo cancellations in communication systems with a sparse echo path, the delay between the far-end signal and its echo in the microphone signal is estimated and the far-end signal provided to the echo canceller is delayed by that estimated delay. This allows shorter filter and smaller buffers to be used in the echo canceller. The element of a system which performs the delay estimation is typically termed a pure delay estimator.

Various pure delay estimation methods are known in the art. Methods based on cross-correlation techniques have high computational complexity and require a large amount of memory. Methods based on Cepstral analysis and similarity functions are complex and not reliable when it comes to stability of operation.

A method proposed by Dyba et al in "Parallel structures for fast estimation of echo path pure delay and their applications to sparse echo cancellers", In Proceedings of CISS 2008, March 2008, pp. 241-245 uses a parallel filter bank implementation which suffers from poor performance during double talk conditions and negative ERL cases due to filter divergence.

Bjrn volcker et al in US Patent Publication 2013/0163698 proposes a delay estimator which operates in the frequency domain and uses binary spectrum matching of near-end and far-end history data. This delay estimator tends to overestimate the delay due to the moving averages involved in the long-term estimation it performs.

BRIEF SUMMARY OF THE INVENTION

According to a first aspect of the present invention there is provided a system for estimating delay between a far-end signal and an echo of the far-end signal in a microphone signal, the system comprising:
- a buffer configured to store a time-series of far-end samples representing the far-end signal;
- a first delay estimator configured to form a first estimate of the delay in respect of a speech frame representing speech in the microphone signal;
- a second delay estimator configured to form a second estimate of the delay for the speech frame by operating a first set of one or more filters on far-end samples selected from the buffer in dependence on an operating delay;
- a second set of one or more filters for operation on far-end samples; and
- a controller configured to, in response to a determination that the first estimate of the delay for the speech frame differs from the operating delay for a previous frame by at least a predefined length of time, cause the one or more filters of the second set to operate on far-end samples selected from the buffer according to the first estimate of the delay and, if in respect of one or more speech frames a measure of convergence of the second set of filters exceeds a measure of convergence of the first set of filters by at least a first predefined threshold, update the operating delay using the first estimate of the delay.

The predefined length of time may be a measure of the extent of far-end samples over which the one or more filters of the first set are configured to operate.

The extent of far-end samples may be the time span between the earliest and latest far-end samples of the time-series on which the one or more filters of the first set are configured to operate in respect of each speech frame.

The first delay estimator may be configured to form the first estimate of the delay by comparing the energy of the microphone signal during periods of speech with the far-end signal over a predetermined set of frequency bins.

The first delay estimator may be configured to generate a binary representation of the energy in each frequency bin for speech frames and frames carrying the far-end signals, and to form the first estimate of the delay by identifying for a speech frame a maximal correlation between the binary representation of the speech frame and the binary representations of far-end frames held at a second buffer, the first estimate of the delay being indicated by the position in the second buffer of the far-end frame at which the maximal correlation occurs.

The first delay estimator may be configured to form short and long term energy estimates for each frequency bin of the far-end and speech frames, the binary representation of the far-end and speech frames in each frequency bin being further representative of the relative size of the corresponding short term and long term energy estimates.

The first delay estimator may be configured to flush the second buffer if one or both of the first and second sets of filters diverge for a predetermined number of speech frames.

The second delay estimator may be configured to determine the operating delay in dependence on one or more estimates of the delay for one or more previous speech frames.

The operating delay for the frame may be the first estimate of the delay for the previous speech frame if the first estimate of the delay for the speech frame differs from the first estimate of the delay for the previous speech frame by less than the predefined length of time.

The operating delay for the speech frame may be the operating delay of the previous speech frame if the first estimate of the delay for the speech frame differs from the first estimate of the delay for the previous speech frame by more than the predefined length of time.

The operating delay may be the first estimate of the delay during initialisation of the first set of filters.

The system may be configured to provide the second estimate of the delay as its output estimate of the delay, at times other than:
  during initialisation of the first set of filters, for which the system is configured to provide the first estimate of the delay as the output estimate of the delay; and/or
  if the measure of convergence of the second set of filters exceeds the measure of convergence of the first set of filters by less than a second predefined threshold, for which the system is configured to provide the previous output estimate of the delay.

The first set of filters may be a plurality of filters and the second delay estimator being configured to, for each filter, select from the buffer far-end samples centred about a respective predetermined offset from the operating delay.

The second delay estimator may be configured to operate one of the filters of the first set at the operating delay.

The second delay estimator may be configured to identify the convergence of each of the filters of the first set and provide as the second estimate of the delay the offset operating delay at which the best converged filter of the first set operates.

The controller may be configured to determine the measures of convergence of the first and second sets of filters from, respectively, measures of convergence of the best converged filters of the first and second sets of filters.

The controller may be configured to derive the measures of convergence of each of the filters of the first and second sets from a ratio of the correlation between the echo estimated by the filter and the microphone signal to the autocorrelation of the microphone signal.

Each of the filters of the first and second sets may be configured to form an estimate of the echo in the microphone signal from the far-end signal.

The second set of filters may be a plurality of filters and the controller may be configured to, in response to said determination, identify the convergence of each of the second filters and update the operating delay for the next speech frame to be the offset operating delay at which the best converged filter of the second set operates.

The controller may be further configured to, in response to said determination, replace filter parameters of the first set of filters with filter parameters of the second set of filters.

The controller may be further configured to, in response to said determination, replace the filter parameters of the filter of the first set which is configured to operate at the operating delay with the filter parameters of the best converged filter of the second set.

The controller may be configured to activate the one or more filters of the second set in response to said determination.

The first and second sets of filters may each comprise a plurality of short adaptive filters.

The system may be configured to identify said speech frames in a stream of frames representing the microphone signal in dependence on an indication received from a voice activity detector.

According to a second aspect of the present invention there is provided a method for estimating delay between a far-end signal and an echo of the far-end signal in a microphone signal, the method comprising:
  receiving a microphone signal;
  storing, in a buffer, a time-series of far-end samples representing the far-end signal;
  forming a first estimate of the delay in respect of a frame representing the microphone signal; and
  forming a second estimate of the delay for the frame by selecting far-end samples from the buffer in dependence on an operating delay and operating a first set of one or more filters on the selected far-end samples;
the method being configured to update the operating delay by:
  checking whether the first estimate of the delay for a frame differs from the operating delay for a previous frame by at least a predefined length of time;
  responsive to the check being positive, operating a second set of one or more filters on far-end samples selected from the buffer according to the first estimate of the delay; and
  if in respect of one or more frames a measure of convergence of the second set of filters exceeds a measure of convergence of the first set of filters by at least a first predefined threshold, update the operating delay using the first estimate of the delay.

The method may further comprise providing the second estimate of the delay as an output.

A non-transitory machine readable storage medium having encoded thereon machine readable code may be provided for generating the system for estimating delay. A non-transitory machine readable storage medium having encoded thereon non-transitory machine readable code may be provided for implementing the method for estimating delay.

BRIEF DESCRIPTION OF THE DRAWINGS

The present invention will now be described by way of example with reference to the accompanying drawings. In the drawings.

DETAILED DESCRIPTION OF THE INVENTION

The following description is presented by way of example to enable any person skilled in the art to make and use the invention. The present invention is not limited to the embodiments described herein and various modifications to the disclosed embodiments will be readily apparent to those skilled in the art.

The pure delay estimator described herein addresses the issues identified above in relation to the prior art. The pure delay estimator could be adapted to provide an estimate of the delay between a far-end signal and its echo in a microphone signal for any kind of echo canceller. The pure delay estimator may for example be for use with an adaptive echo estimate filter (AEEF), which is a type of echo canceller. More generally, the pure delay estimator described herein could be adapted to identify the delay between a signal and a delayed echo of that signal in any kind of system, and is not limited to the identification of a delay of a signal on an audio path in a communication system.

Figure 1:
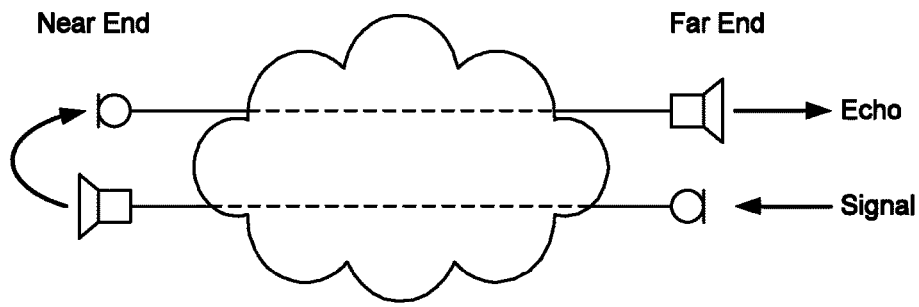
FIG. 1 illustrates the concepts of near-end and far-end in telephony.
Figure 2:
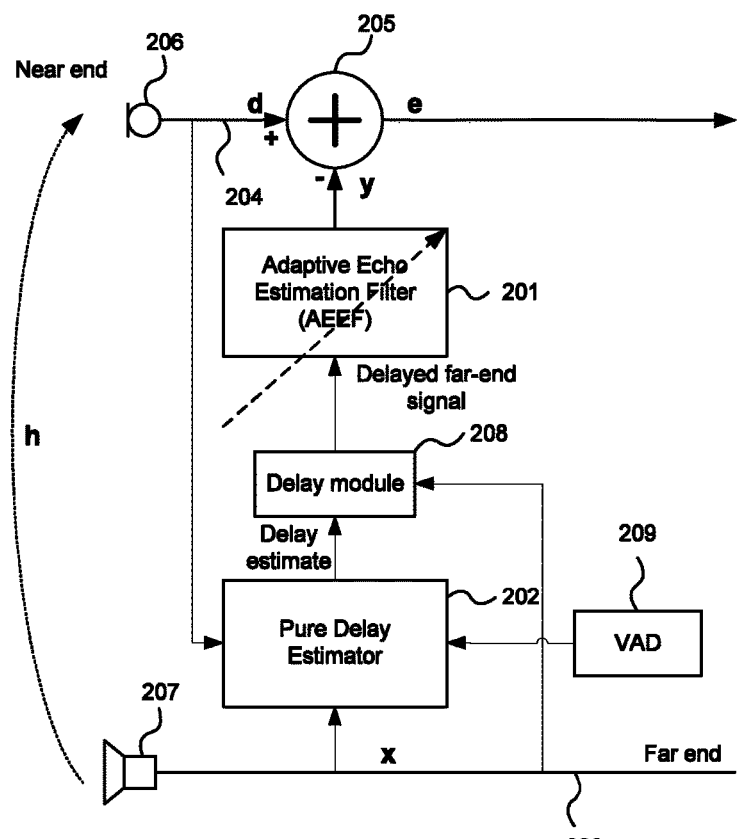
FIG. 2 is a schematic diagram of an arrangement of an adaptive echo estimation filter (AEEF) and pure delay estimator at a communication device.

FIG. 2 shows a typical arrangement of an adaptive echo estimate filter (AEEF) 201 and pure delay estimator 202 at a communication device 200 (e.g. a VoIP handset) operable to communicate with another such communication device in the manner discussed above with respect to FIG. 1. The far-end signal x 203 is output by a speaker 207 at the communication device. A microphone signal d 204 is captured by microphone 206 and includes an echo of the far-end signal x output by speaker 207 due to acoustic coupling between the microphone and speaker as indicated by impulse response h (which may also represent the influence of hardware and software in the audio driver interface and other devices in the audio path). The microphone signal further includes ambient background noise and, from time-to-time, may include near-end speech. The echo in the microphone signal is delayed relative to the output of the corresponding far-end signal x, and is filtered by the acoustic path between speaker and microphone.

A pure delay estimator (PDE) 202 is arranged to receive the far-end signal 203 and microphone signal 204 and form an estimate of the delay between the far-end signal and its echo in the microphone signal. The far-end signal 203 is delayed at delay module 208 by the delay estimate formed by the PDE 202 and provided to AEEF 201 which estimates the acoustic echo signal y received at the microphone from the speaker. The estimated echo is subtracted from the microphone signal by the subtractor 205 so as to yield an error signal e representing the difference between the microphone signal and the estimated echo signal. The AEEF 201 models the impulse response h of the echo path so that when the filter 201 is converged the error signal e substantially represents the microphone signal from which far-end echo has been cancelled.

Communication device 200 may further comprise a voice activity detector (VAD) 209 configured to identify frames which contain speech in the stream of frames representing microphone signal 204. The PDE may receive from the VAD an indication as to which microphone frames contain speech and are to be operated on by the PDE.

The operation of an improved pure delay estimator (PDE) 202 will now be described with reference to FIGS. 3-5. The PDE may be configured to form an estimate of the pure delay in respect of speech frames only. This avoids spurious delay estimates being formed when the noise in the far-end signal is similar to the noise in the microphone signal.

Figure 3:
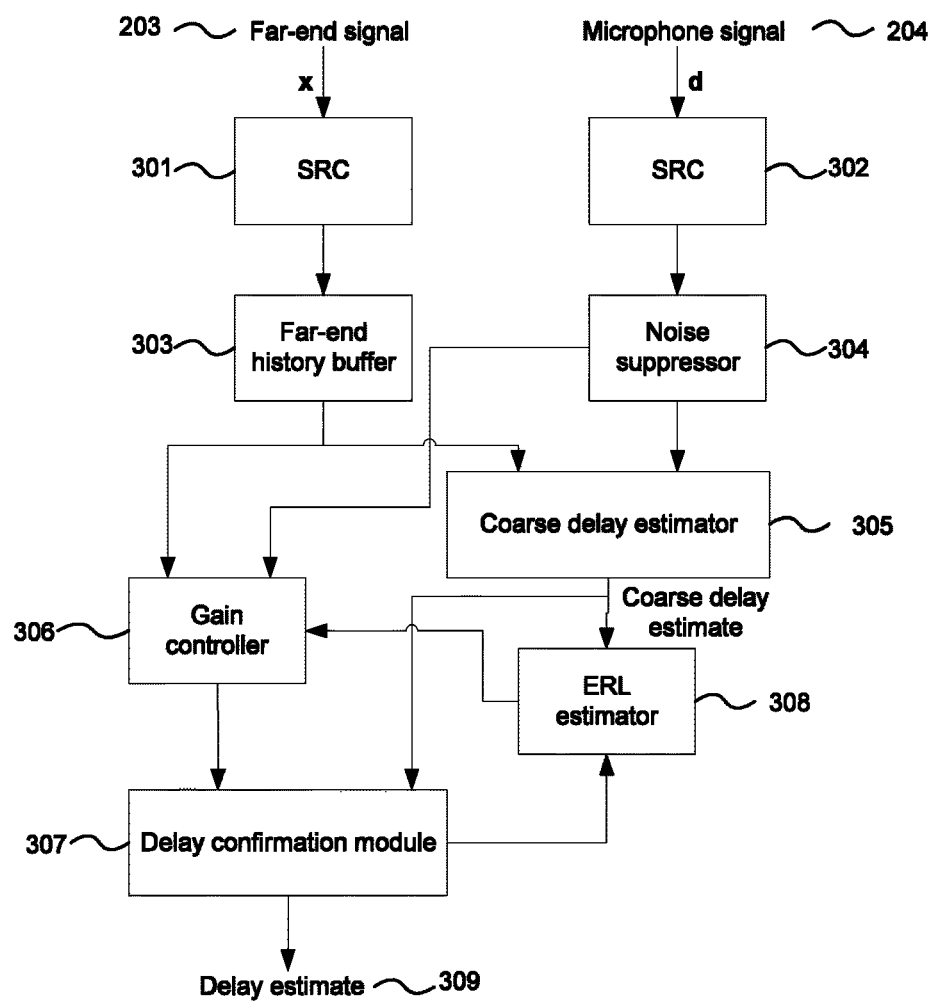
FIG. 3 is a schematic diagram of the pure delay estimator shown in FIG. 2.

A schematic diagram of the pure delay estimator 202 is shown in FIG. 3. As described in more detail below, the PDE 202 includes: (i) a coarse delay estimator 305 which provides a coarse estimate of the echo delay, and (ii) a delay confirmation module (DCM) 307 which fine-tunes the coarse delay and stabilizes the delay estimation over time.

The PDE 202 receives far-end signal 203 and microphone signal 204, both of which are downsampled (e.g. to 4 kHz) at respective sample rate converters (SRCs) 301 and 302. This reduces the complexity and resource requirements of the PDE and makes the PDE robust to changes in the sampling rate of signals 203 and 204. The signals 203 and 204 would typically have a sampling rate of at least 8 kHz. In other examples, other sample rates could be used as appropriate to the particular implementation (including upsampling), or no conversion of sample rates may be performed at all.

The converted frames of far-end samples representing signal 203 are stored at a far-end history buffer 303, which in this example is a circular buffer. Length of buffer 303 is chosen to be sufficient to accommodate the expected range of delays of echoes observed for a given platform. The converted frames of microphone samples representing signal 204 may be passed through a noise suppressor 304 to remove background noise and enhance the echo. This can be advantageous in cases of positive echo return loss (ERL) where high energy background noise may overshadow low energy echo. The microphone samples may also be buffered.

The PDE may be configured to form an estimate of the pure delay for each frame of a stream of frames representing the microphone signal in which speech is present, i.e. in speech frames. The PDE may determine whether each frame comprises speech from a suitable indication received from a voice activity detector.

Coarse delay estimator 305 is configured to compare the buffered frames representing the far-end signals to speech frames representing the microphone signal so as to form an initial (coarse) estimate of the delay between the far-end signal and its echo in the microphone signal. This could be performed in any suitable manner which yields at least a rough approximation of the delay. A coarse delay estimate may be generated for each speech frame. In the present example, the coarse delay estimator forms a coarse estimate of the delay by comparing binary representations of the frequency spectra of the two signals, as is described below in relation to FIG. 4. An estimate of echo return loss (ERL), which is the ratio of the level of the far-end signal to the level of echo in the microphone signal, may optionally be formed at an ERL estimator 308 according to any suitable technique. Typically a measure of ERL would be available as a measure of the performance of the AEEF 201. The ERL is used to select gain values at optional gain controller 306 which are used to attenuate the far-end and microphone sample streams provided to delay confirmation module 307. The delay confirmation module 307 also receives the coarse delay estimate from the coarse delay estimator 305. The output of the delay confirmation module is the estimate of the delay 309 between the far-end signal and its echo in the microphone signal, which has been fine-tuned and stabilised compared to the coarse delay estimate, as described in more detail below with reference to FIG. 5.

Coarse Delay Estimator

The operation of the coarse delay estimator will now be described with reference to FIG. 4.

The coarse delay estimator 305 operates in the frequency domain to establish an approximate delay estimate. The coarse delay estimator forms binary spectra representing the frequency content of far-end frames and speech frames by comparing for each frame a long term average of the energy in a set of frequency bins to the short term energy in those bins. Roughly speaking, a coarse delay estimate can then be identified by determining a position of greatest match between the far-end and microphone binary spectra.

Figure 4:
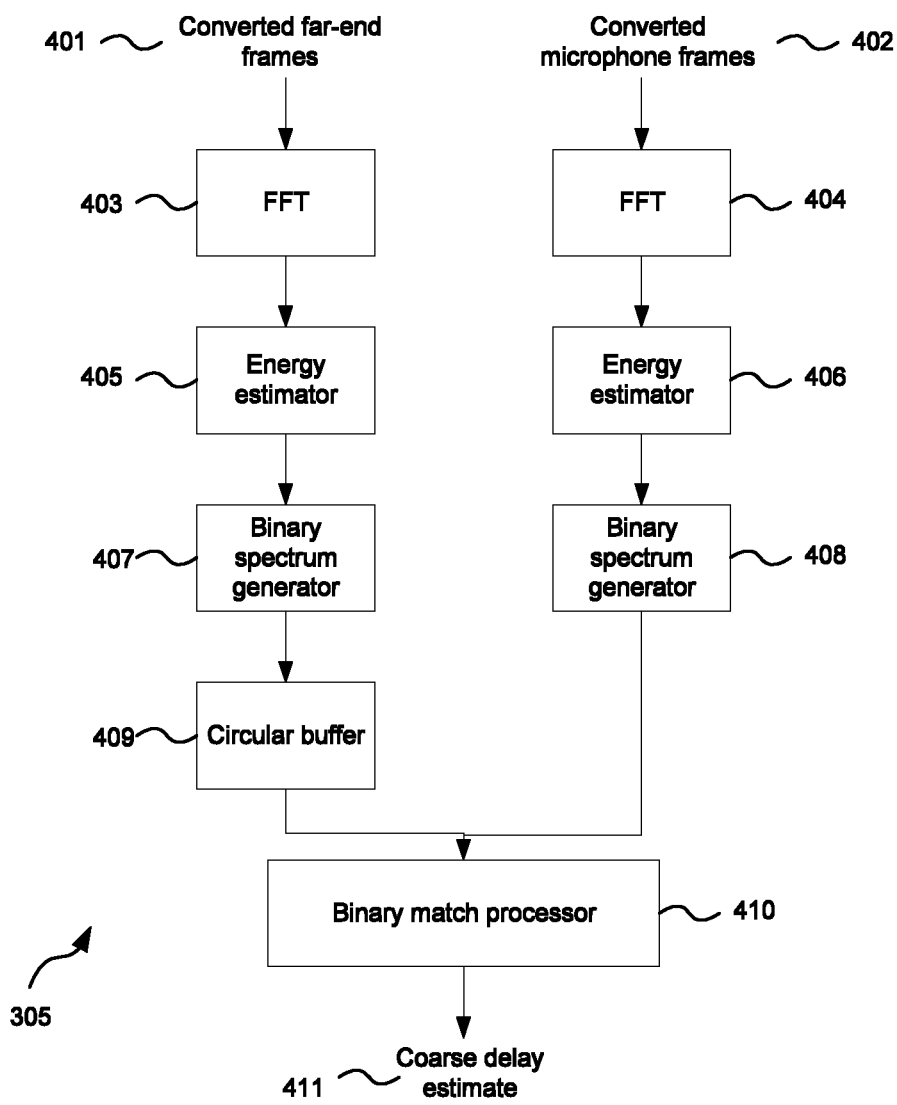
FIG. 4 is a schematic diagram of the coarse delay estimator shown in FIG. 3.

A schematic diagram of coarse delay estimator 305 is shown in FIG. 4. As has been described in relation to FIG. 3, the coarse delay estimator receives as inputs converted frames 401 and 402 representing the far-end and microphone speech signals, respectively. The samples of the frames are transformed into the frequency domain through the use of FFTs (Fast Fourier Transforms) 403 and 404. Other techniques could be used to form an estimate of the energy of each frame over a predetermined set of frequency bins. Each FFT forms an estimate of the energy content of a received frame in a set of frequency bins. In the exemplary coarse delay estimator shown in FIG. 3, samples representing the far-end and microphone signals are carried in frames of 10 ms in length, each frame carrying 40 samples. Good performance can be achieved using 128-point FFTs 403 and 404 operated on each frame concatenated with 88 samples of past data. For example, each far-end or speech frame comprises 40 samples which are combined with the previous 88 samples buffered following sample rate conversion (e.g. at far-end history buffer 303, or at an equivalent buffer for the microphone signal path, as appropriate).

Energy Estimation

Since speech energy tends to be concentrated within a limited frequency range, energy estimators 405 and 406 are configured to only consider frequency bins lying within a predetermined frequency range in which speech energy is likely to be concentrated. A suitable frequency range lies approximately between 320 Hz and 2700 Hz, which for the exemplary 128-point FFTs described above may be represented by 32 frequency bins. Energy estimators 405 and 406 may discard the measures of energy formed by the FFTs for frequency bins lying outside the predetermined frequency range. This reduces the complexity of the coarse delay estimator, and improves its accuracy given its available resources. It is further advantageous if the energy estimators average over one or more frames, e.g. 4 frames, the spectral energies determined at the FFTs for the frequency bins lying in the predetermined range. For example, the energy estimator could form an average energy spectrum for a given frame by calculating an average (e.g. a mean) from the energy spectra of that frame and the three previous frames.

The averaged FFT of each far-end or near-end frame is used at the respective energy estimator to form short term and long term energy estimates for that frame. For example, a short term energy estimate may be formed as follows. Consider the FFT of an $l^{th}$ frame $x_l$ given by:

$$x_l = [x(l*L), x((l*L)-1), \ldots x((l-1)*L+1)] \quad (1)$$

where L is the frame size.

The FFT of frame $x_l$ can be expressed as:

$$X_l = FFT(x_l) \quad (2)$$

The FFT averaged over K frames can be expressed as:

$$X_f(k, l) = \frac{1}{k} \sum_{n=0}^{K-1} X_l(k, l-n) \quad (3)$$

where $X_f$ is the FFT (i.e. energy estimate) of the $k^{th}$ frequency bin of the $l^{th}$ frame.

The short term energy estimate of each bin S is then given by the sum of the real and imaginary parts of that bin:

$$S(c,l) = (Re(X_f(11+c,l))^2 + Img(X_f(11+c,l))^2) \quad (4)$$

where $1 \le c \le 32$ which relate to the 32 frequency bins representing the frequency region in which speech is dominant (i.e. bins 1 to 11, and 44 and above are discarded or not considered). Short term energy estimates are calculated at energy estimators 405 and 406 for frames on each of the far-end and microphone signal paths, respectively.

The long term energy estimate for each bin L is estimated by averaging the short term energy estimate using a first order adaptive low pass filter. A suitable filter coefficient α and affine offset γ for the filter can be determined for each bin from a difference P between the short term energy estimate of the current frame and the long term energy estimate of the previous frame:

$$P(c,l) = S(c,l) - L(c,l-1) \quad (5)$$

The long term energy estimate for each bin is given by:

$$L(c,l) = L(c,l-1) + (\alpha(l) * P(c,l)) + (\gamma(l) * \beta_5) \quad (6)$$

and the filter coefficient and affine offset by:

$$\alpha(l) = \begin{cases} \beta_3 & \text{if } P(c, l) < \beta_1 \text{ and } P(c, l) < 0 \\ \beta_4 & \text{if } P(c, l) < \beta_1 \text{ and } P(c, l) > 0 \\ 0 & \text{else} \end{cases} \quad (7)$$

$$\gamma(l) = \begin{cases} 0 & \text{if } P(c, l) < \beta_1 \text{ and } P(c, l) < 0 \\ 0 & \text{if } P(c, l) < \beta_1 \text{ and } P(c, l) > 0 \\ 1 & \text{else} \end{cases} \quad (8)$$

where $\beta_1$ to $\beta_5$ are parameters chosen appropriate to the filter. They may be empirically determined. Long term energy estimates are calculated at energy estimators 405 and 406 for frames on each of the far-end and microphone signal paths, respectively.

Other estimates of long term energy could alternatively be calculated at the energy estimators 405 and 406 based on some average of the short term energy estimate given above for each bin.

Binary Matching

The estimates of short and long term energy are used at binary spectrum generators 407 and 408 to form a binary spectrum for each frame. Roughly speaking, the binary spectrum is configured to, for each frequency bin, represent as a 1 or 0 the energy present in the frame. The energy content of frequency bins for which the energy exceeds one or more predefined thresholds calculated on the basis of the short and long term energy estimates are represented by a 1, otherwise the energy content is represented by a 0. A suitable binary spectrum B can be generated as follows:

$$B(c, l) = \begin{cases} 1 & \text{if } S(c, l-1) > \alpha * L(c, l-1) \text{ and } L(c, l-1) > \delta \\ 0 & \text{else} \end{cases} \quad (9)$$

where δ is a parameter chosen appropriate to the platform (e.g. it may be empirically determined).

Binary spectra are calculated at energy estimators 405 and 406 for frames on each of the far-end and microphone signal paths, respectively. In the exemplary coarse delay estimator described above, the binary spectra B are 32-bit variables representing the energy content of the bins of a frame in binary form.

The binary spectra generated for frames received on the far-end signal path are stored at a history buffer 409, which in this example is a circular buffer. Other types of buffer could be used. The length of the circular buffer is chosen to be sufficiently large to accommodate the expected echo delay. The binary spectra generated for frames received on the microphone signal path may or may not be stored at a buffer. A binary match processor 410 compares the binary spectra of speech frames to the binary spectra of far-end frames held in the circular buffer in order to identify a match between the two. A match between the speech and far-end frames indicates that the speech frame is likely to include an echo of the far-end signal and the position of that far-end frame in the circular buffer is indicative of the delay between the two because the time at which those near-end and far-end frames were received is known.

In order to obtain a good estimate of the coarse delay, the following process can be followed. The binary match processor compares the binary spectrum of each received speech frame to each of the far-end frames held at the circular buffer. When a match is found between the binary spectra for a given frequency bin (e.g. both are a 0 or a 1), this is indicated by a 1 in a 32-bit value M representing the match between each far-end spectrum and the near-end spectrum. In other words, the binary match processor performs a binary AND comparison between the binary spectra. The match values M for each of the far-end and speech frame combinations can be maintained in a buffer.

To form the coarse delay estimate 411, a moving average is performed on the match values M so as to form a moving average value in respect of each far-end binary spectrum held at buffer 409. The far-end binary spectrum having the greatest respective moving average value indicates the far-end frame which most closely matches the near-end frame in the range of speech frequencies considered. The time difference between that far-end frame and the speech frame is used as a coarse delay estimate 411 of the delay between the far-end signal and its echo in the microphone signal. This coarse delay estimate 411 is outputted from the coarse delay estimator 305 and provided to the ERL estimator 308 and to the DCM 307.

For example, the relative frame numbers could be used to indicate the delay: e.g. if the identified far-end frame is number 4367 and the speech frame is number 4371 then, provided that the sampling of the near-end and far-end signals is synchronised and corresponding frame numbers are used, then the delay is given by 4371−4367=4 frames, which for frames of length 10 ms corresponds to a 40 ms delay. Alternatively the frames might have an associated time stamp, or the timing information might be available elsewhere in the system (e.g. at the near-end and far-end samplers) based on the frame numbers. Other forms of averaging or filtering could be used to estimate the binary spectrum held at buffer 409 which most closely matches that of a received speech frame.

Delay Confirmation Module

The coarse delay estimate is used in the PDE 202 by delay confirmation module 307 to generate for each speech frame an accurate estimate of the delay between the far-end signal and its echo in the microphone signal. A schematic diagram of the delay confirmation module 307 is shown in FIG. 5 and its operation will now be described.

Figure 5:
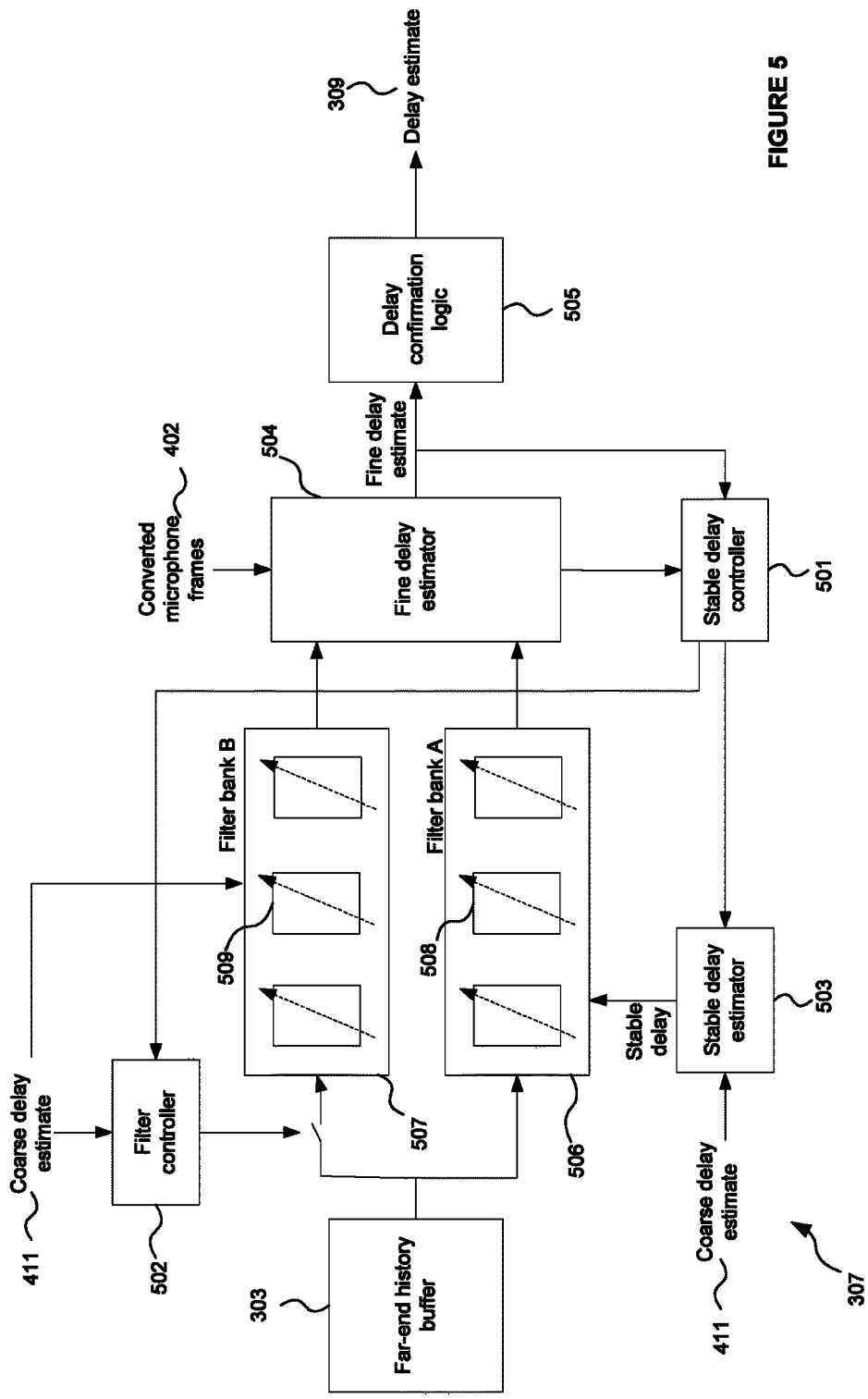
FIG. 5 is a schematic diagram of the delay confirmation module shown in FIG. 3.

In FIG. 5, the delay confirmation module 307 comprises several logical elements: a filter controller 502, a stable delay estimator 503, a fine delay estimator 504, a stable delay controller 501, and delay confirmation logic 505. Collectively these elements may be considered to represent a controller for the delay confirmation module 307. The delay confirmation module also comprises a pair of filter banks operating on far-end samples from far-end history buffer 303: filter bank A 506 comprising a plurality of filters 508 and filter bank B 507 comprising a plurality of filters 509. Filter bank A is used to generate a fine delay estimate which can be provided as the output of the PDE. The use of multiple filters at filter bank A helps to ensure an accurate estimate of the pure delay is generated by the PDE and to filter out any errors, especially those due to errors in the long term energy estimates calculated at the coarse delay estimator. Filter bank B is used in the manner described below to verify changes in the delay estimate so as to filter out any estimation errors of coarse delay estimation, for example due to double talk or near-end speech. Filter bank B ensures that any substantial changes indicated by the coarse delay estimate are valid. By using two filter banks, changes in pure delay which exceed the span of filter bank A can be tracked. More generally, each filter bank may have one or more filters. In the case a filter bank comprises only one filter, its output is the fine delay output of the filter bank. The delay confirmation module may include more than two filter banks.

Filter Bank A

Filter bank A 506 is configured to operate about a stable delay S_dly for the current frame. This means that the filters of the filter bank operate on samples selected from a location in the far-end history buffer in dependence on the stable delay—e.g. the far-end samples loaded from the buffer into the filters of filter bank A are loaded from a location which indicates that they preceded the near-end samples by approximately the stable delay. Each filter 508 of the filter bank A 506 is configured to operate at (i.e. is centred about) a different offset to the stable delay, preferably with one of the filters operating at zero offset, i.e. at the stable delay. Preferably there are at least three filters, including a filter configured to operate on far-end samples selected from buffer 303 according to the stable delay, a filter configured to operate on far-end samples selected from buffer 303 according to the stable delay offset by a negative value, and a filter configured to operate on far-end samples selected from buffer 303 according to the stable delay offset by a positive value.

The span of filter bank A is given by the spread in time represented by the far-end samples loaded into the filter bank and over which its filters are configured to operate. The span of the filter bank 506 is therefore the time period or extent between the earliest far-end sample and the latest far-end sample loaded into the filter bank from the stored time-series of far-end frames held at buffer 303. This represents an extent For a filter bank in which the filters are of the same length and arranged end-to-end with no overlap, the span of the filter bank is therefore given by the range of offsets of the filters of the filter bank plus the length of filter used. For example, if the stable delay is 120 ms and filter bank A includes three filters each 20 ms in length operating at delays of 100 ms, 120 ms and 140 ms, the span of filter bank A is 140−100+20=60 ms. The offsets of the filters in the filter bank may be predefined and may be symmetrical about the stable delay. The filters of a bank may differ in length. The filters of a bank may overlap such that some far-end samples are present in more than one filter.

The filters of filter banks A and B may be short adaptive filters (e.g. 10 or 20 ms in the examples provided herein). The filters of the filter banks may be substantially shorter than the typical delay experienced between the far-end and microphone signal paths of the device at which the system is provided (e.g. less than half, less than a third, less than a quarter, or less than a fifth of the typical delay). Filter banks A and B may have the same or different spans. Each of the filters of the filter banks is configured to simulate the acoustic coupling between the speaker and microphone of the communication device 200 such that when the filters operate on sets of far-end samples, the output of the filters is an estimate of the expected echo that would be observed in the microphone signal for the respective set of far-end samples.

The stable delay estimator 503 is configured to determine the stable delay about which filter bank A is arranged to operate from the coarse delay estimate 411 generated by the coarse delay estimator. The stable delay is an example of an operating delay of filter bank A. For example, for a given speech frame the stable delay could be chosen to be the coarse delay estimate for that frame, or it could be chosen to be the coarse delay estimate for the previous frame. In preferred examples, the stable delay is determined in dependence on the coarse delay estimate of the current frame and a characteristic delay estimate of the previous speech frame according to the following logic. The characteristic delay for the previous frame represents a delay estimated for the previous speech frame and could be, for example, the stable delay for the previous speech frame or the output delay estimate for the previous speech frame.

When the coarse delay estimate for the speech frame differs from the characteristic delay for the previous speech frame by less than the span of the first filter bank, the coarse delay estimate for the previous speech frame is used as the stable delay.

In cases in which the coarse delay estimate for a speech frame differs from the characteristic delay for the previous frame by greater than the span of filter bank A, filter bank B 507 is activated and used to verify whether the change in delay is valid in the manner described below. The stable delay could be, for example, maintained at its previous value or set to the output delay estimate for the previous frame while filter bank B tests whether the coarse delay estimate represents a better location for to generate a fine delay estimate than the current stable delay (e.g. the stable delay value of the previous speech frame or the output delay estimate for the previous speech frame).

In cases which a previous stable delay is not available because the system has just started or been reconfigured, the coarse delay estimate for the current speech frame can be used as the stable delay.

For each received speech frame, each filter of filter bank A receives far-end samples from far-end history buffer 303 appropriate to its delay offset. For example, if a filter operates at a delay of 120 ms it receives samples from the far-end history buffer centred about that corresponding delay. The number of samples loaded by a filter depends on the length of that filter. Each of the filters operates on its set of far-end samples so as to generate a filtered output.

The fine delay estimator 504 selects as a fine estimate of the delay from filter bank A the delay offset of the best converged of the filters of the filter bank. In other words, if in the above example the filter operating at a delay offset of 140 ms is the best converged of the filters, the fine delay estimate is 140 ms. The fine delay estimator could determine the convergence of the filters in any suitable way. For example, the fine delay estimator could receive converted near-end frames 402 and calculate a convergence factor for each filter as the ratio of the cross-correlation between the microphone signal and echo estimate generated by the filter and the autocorrelation of the microphone signal:

$$convg(n) = \frac{r_d y(n)}{dd^2(n)} \quad (10)$$

where $dd^2(n)$ represents the autocorrelation of the microphone signal, $r_d$ represents the microphone signal and $y(n)$ represents the echo estimate.

The fine delay estimator 504 may generate the convergence factor for each sample of a frame. The convergence factors for the samples of a frame may be used to form a convergence factor for the frame, for example by forming an average (e.g. a mean or weight mean) of the convergence factors of the samples for the frame. For pure echo regions and a well converged filter, the echo estimate and microphone contents will be very similar and the value of the convergence factor will be close to unity. During regions of near-end speech the convergence factor will be close to zero. Thus the magnitude of the convergence factor is indicative of the degree of convergence of a filter. Other measures of convergence could be used to select between the filters or filter banks.

Subject to the delay confirmation mechanisms described below, the fine delay estimate of filter bank A is used as the output delay estimate 309 of the pure delay estimator.

Filter Bank B

A filter controller 502 is configured to identify when the coarse delay estimate 411 for a speech frame differs from the characteristic delay for a previous speech frame by greater than the span of filter bank A. When this condition is met, the filter controller activates filter bank B. In other examples, filter bank B may be normally active and filter controller instead determines when the output of filter bank B is used. The switch shown in FIG. 5 is merely schematic to indicate that filter bank B or its output is only used in certain circumstances. The previous speech frame used in this condition may be the speech frame immediately preceding the current speech frame, may be any other preceding speech frame in a consecutive sequence of speech frames, or may be an average of one or more preceding speech frames in a consecutive sequence of speech frames, to give some examples.

It is advantageous to configure the filter controller to reset the filter states of filter banks A and B when the coarse delay estimate 411 for a speech frame differs from the characteristic delay for a previous speech frame by greater than the span of filter bank A. This ensures that filter banks A and B both start from equivalent positions and hence allows an objective comparison of the performance of the two filter banks.

Filter bank B is configured analogously to filter bank A but the filters of filter bank B operate according to the coarse delay estimate for the current speech frame in order to determine whether the coarse delay estimate represents a valid change. Each filter 509 of filter bank B 507 operates at (i.e. is centred about) an offset from the coarse delay estimate. When filter bank B is activated, a fine delay estimate is also formed by the fine delay estimator 504 for that filter bank in an analogous manner: e.g. the convergence of each filter in bank B is determined and the delay offset of the best converged filter is selected as the fine delay estimate for filter bank B. In preferred examples, filter banks A and B are equivalent such that the filter coefficients of filter bank B may be loaded into filter bank A according to the mechanism described below.

The fine delay estimates for filter banks A and B and measures of convergence of the respective filters of filter banks A and B are used by stable delay controller 501 to determine whether to update the stable delay S_dly about which filter bank A operates. The measure of convergence (e.g. a convergence factor) of the best converged filter of filter bank A may be used as the measure of convergence for filter bank A, and the measure of convergence (e.g. the convergence factors) of the best converged filter of filter bank B may be used as the measure of convergence for filter bank B. The comparison between the fine delay estimates and convergence factors for filter banks A and B can be performed over one or more speech frames. Performing the comparison over more than one speech frame helps to avoid fluctuations in the delay estimate and hence enables an AEEF coupled to the PDE to better cancel echo in the microphone signal.

The stable delay controller 501 can be configured to control the selection of the stable delay for filter bank A 506 according to one or more of the following rules:
  if filter bank A is better converged than filter bank B for one or more speech frames, the stable filter set of bank A is maintained and filter bank B can be deactivated; it is also advantageous to reset the binary spectra generated at the coarse delay estimator 305 (e.g. by flushing buffer 409) so as to allow the coarse delay estimator to start afresh its estimation of the coarse delay;
  if filter bank A is not converging and the degree of convergence of filter bank B exceeds a predefined threshold for one or more speech frames, filter bank A is updated to use the fine delay estimate from filter bank B as its stable delay for the next speech frame; it is further advantageous to load the coefficients of filter bank A into filter bank B such that the filter coefficients of the best converged filter of bank B are subsequently available for use in filter bank A;
  if the degree of convergence of filter bank B exceeds the degree of convergence of filter bank A by at least a predefined threshold for one or more speech frames, then filter bank A is updated to use the fine delay estimate from filter bank B as its stable delay for the next speech frame; it is further advantageous to load the coefficients of filter bank A into filter bank B such that the filter coefficients of the best converged filter of bank B are subsequently available for use in filter bank A.

In cases in which all of the filters of filter bank A are diverging it is advantageous to reset the binary spectra generated at the coarse delay estimator 305, e.g. by flushing buffer 409. This helps the coarse delay estimator to more rapidly form an estimate of the coarse delay following changes in the delay between a far-end signal and its echo in the microphone signal because it avoids the coarse delay estimator being influenced by old binary representations of the far-end signal from before the change in delay occurred. In turn this helps the filters of filter bank A to quickly re-converge on the new delay and hence the output of the PDE to track changes in pure delay at low latency.

Appropriate convergence thresholds above which filter bank A is updated with the fine delay estimate from filter bank B may be empirically determined for a given audio platform.

It can be advantageous to configure the convergence threshold (above which filter bank A is updated to use the fine delay estimate from filter bank B as its stable delay) in dependence on whether coarse delay estimate is larger or smaller than the stable delay. A higher threshold may be used for coarse delay estimates which are larger than the stable delay than for coarse delay estimates which are smaller than the stable delay. For example, consider the case in which the stable delay about which filter bank A operates is 200 ms: if the coarse delay estimate is 300 ms a larger threshold could be applied than if the coarse delay estimate is 100 ms. Additionally or alternatively, the delay confirmation module can require that the convergence of filter bank B exceeds the convergence of filter bank A by the required threshold for a greater number of frames in cases in which the coarse delay estimate is larger than the stable delay as compared to cases in which the coarse delay estimate is smaller. These steps can help to avoid over-compensation of far-end data which may damage the convergence of an echo cancellation filter arranged to receive the pure delay estimate from the PDE.

In cases in which filter bank A is at least partially converging, it can be advantageous to configure the stable delay controller 501 to verify the new filter location about which filter bank B is arranged to operate over a greater number of frames than in cases in which filter bank A is not converging.

The above mechanism allows the delay confirmation module 307 to verify by means of a second filter bank B 507 whether the stable delay about which filter bank A operates (and which is used to generate a fine delay estimate for use as the output of the PDE) should be updated in light of a change in a coarse estimate of the delay which is greater than the span of filter bank A. As a result, sudden changes in echo path can be accommodated by the pure delay estimator, with the PDE being able to maintain a reliable pure delay throughout such transitions.

Delay Confirmation Logic

Prior to setting the output of the pure delay estimator to the fine delay estimate of filter bank A, it can be advantageous for delay confirmation logic 505 to verify whether the estimated delay is valid. This can be performed in dependence on the difference between the fine delay estimate and the previous delay estimate output by the PDE for the previous frame. If the fine delay estimate cannot be confirmed, the delay confirmation logic may choose to maintain the output delay estimate as the previous delay estimate.

State A. When the fine delay estimate has not previously been confirmed by the delay confirmation logic as being a valid delay estimate, one or more of the following mechanisms can be performed to identify whether a delay value other than the fine delay estimate should be used:
  during startup of the system or following configuration changes, the coarse delay estimate can be provided as the output delay estimate of the PDE;
  when the fine delay estimate is substantially oscillating between two states, the output delay estimate is set to the minimum delay of the two states for a predefined number of speech frames;
  when the filter at the current output delay estimate diverges for a predetermined number of speech frames, the fine delay estimate is used as the output delay only if the difference between the fine delay estimate and the previous delay estimate exceeds a predetermined threshold.

State B. When the difference between the current coarse delay estimate and the current stable delay about which filter bank A operates is less than the span of filter bank A, one or more of the following mechanisms can be performed to identify whether a delay value other than the fine delay estimate should be used:
  if the fine delay estimate and the previous delay estimate are the same, this can be an indication of a spurious delay change by the coarse delay estimator and no change to the output delay is made;
  if the fine delay estimate and the previous delay estimate are different, the output delay is changed only if confirmed by subsequent fine delay estimates within predetermined bounds.

State C. When the fine delay estimate and the previous output delay estimate are different, this indicates that the filter operating at the fine delay estimate is better converging than the filter operating at the previous output delay estimate. One or more of the following mechanisms can be performed to identify whether a delay value other than the fine delay estimate should be used:

if the filter operating at the previous output delay estimate receives silence as its far-end samples (e.g. as determined by a voice activity detector operating on the far-end signal path), no change to the output delay is made;

if the degree of convergence of the filter operating at the fine delay estimate exceeds the degree of convergence of the filter operating at the output delay estimate by less than a predefined amount, no change to the output delay is made;

if the filter operating at the previous output delay estimate is only partially converged, the output delay is changed only if confirmed by subsequent fine delay estimates within predetermined bounds;

if the filter operating at the previous output delay estimate is diverging, the logic is moved to state A above.

These mechanisms help to ensure the PDE provides a stable and robust estimate of the pure delay present at an audio path of a communication device.

Figure 6:
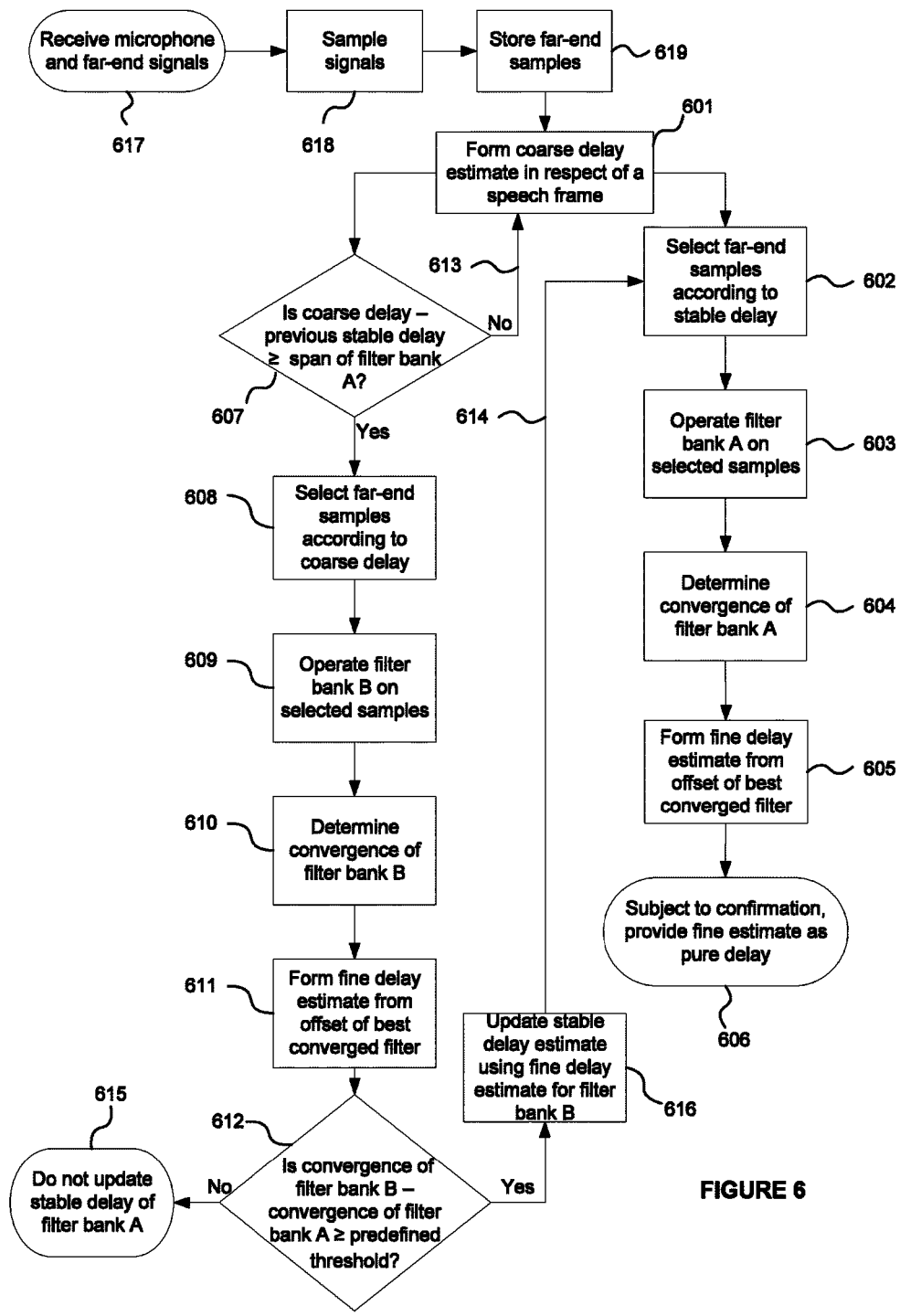
FIG. 6 is a flowchart illustrating the operation of the pure delay estimator.

The operation of the pure delay estimator 202 is illustrated in the flowchart shown in FIG. 6. The PDE receives microphone and far-end signals 617 which are sampled at the sample rate at which the PDE operates 618 in the manner described above with reference to FIG. 3. The far-end samples are stored 619 at history buffer 303 so as to provide a time-series of far-end samples on which the filters of the delay confirmation module of the PDE operate. The coarse delay estimator then forms a coarse delay estimate 601 in respect of a frame of speech in the microphone signal 601. The delay confirmation module loads (602) far-end samples from history buffer 303 into the filters of filter bank A in accordance with the stable delay determined by the stable delay estimator 503 and the offsets from that stable delay at which each of the filters of the bank are configured to operate. The filters of filter bank A operate on their respective far-end samples 603 so as to form an estimate of the echo of those respective far-end samples in the microphone signal. By comparing the convergence of the filters of bank A 604, the best converged filter of the bank can be identified and the delay offset at which that filter operates is used as the fine delay estimate 605. Subject to the operation of confirmation logic 505, the fine delay estimate is provided as the pure delay output 606 of the PDE.

In parallel with the operation of filter bank A, filter controller 502 determines whether the coarse delay estimate differs from the stable delay for the previous speech frame by at least the span of filter bank A 607. If it does, filter bank B is activated and far-end samples are loaded into the filters of bank B in accordance with the coarse delay estimate and the offsets from that coarse delay estimate at which each of the filters of the bank are configured to operate 608. Filter banks A and B then operate in parallel. If the coarse delay estimate does not sufficiently differ from the previous stable delay to satisfy the test at step 607, filter bank B is not activated 613 and only filter bank A performs filtering so as to form a fine delay estimate in respect of the received speech frame.

In the same manner as the filters of filter bank A, the filters of filter bank B operate on their respective far-end samples 609 so as to form an estimate of the echo of those respective far-end samples in the microphone signal. By comparing the convergence of the filters of bank B 610, the best converged filter of the bank can be identified and the delay offset at which that filter operates is used as the fine delay estimate 611 of filter bank B. If a measure of convergence of the best converged filter of filter bank B exceeds a measure of convergence of the best converged filter of filter bank A by at least a predefined threshold 612, the stable delay about which filter bank A operates is updated with the fine delay estimate for filter bank B 616. Otherwise, the stable delay of filter bank A is not updated 615.

In many situations where the microphone signal contains significant signal energy that is independent of any echo this will be due to talking at the near-end. This situation is conveniently denoted "near-end speech" herein. The signal energy might, of course, be due to a different sound source. This is particularly true during teleconferencing or hands-free operation. Therefore, the term "near-end speech" is used to refer to any significant signal energy in the microphone signal that is not due to an echo. It should also be understood that the term "near-end speech" is largely synonymous with the term "double-talk".

The pure delay estimator of FIG. 3, coarse delay estimator of FIG. 4, and delay confirmation module of FIG. 5 are shown as comprising a number of functional blocks. This is schematic only and is not intended to define a strict division between different logic elements. Each functional block or grouping of functional blocks can be provided in any suitable manner, including as one or more software routines and/or hardware units.

The terms software and program code as used herein includes executable code for processors (e.g. CPUs and/or GPUs), firmware, bytecode, programming language code such as C or OpenCL, and modules for reconfigurable logic devices such as FPGAs. Machine-readable code includes software/program code, as well as code for defining hardware representations of integrated circuits at any level, including at register transfer level (RTL), at high-level circuit representations such as Verilog or VHDL, and lower-level representations such as OASIS and GDSII.

The algorithms and methods described herein could be performed by one or more physical processing units executing software that causes the unit(s) to perform the algorithms/methods. The or each physical processing unit could be any suitable processor, such as a CPU or GPU (or a core thereof), or fixed function or programmable hardware. Machine-readable code could be stored in non-transitory form at a machine readable medium such as an integrated circuit memory, or optical or magnetic storage. A machine readable medium might comprise several memories, such as on-chip memories, computer working memories, and non-volatile storage devices.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A system for estimating delay between a far-end signal and an echo of the far-end signal in a microphone signal, the system comprising:
   a buffer configured to store a time-series of far-end samples representing the far-end signal;

a first delay estimator configured to form a first estimate of the delay in respect of a speech frame representing speech in the microphone signal;

a second delay estimator configured to form a second estimate of the delay for the speech frame by operating a first set of one or more filters on far-end samples selected from the buffer in dependence on an operating delay, wherein the second estimate of the delay is used by the system as an output estimate of the delay;

a second set of one or more filters for operation on far-end samples; and a controller configured to, in response to determining that the first estimate of the delay for the speech frame differs from an operating delay for a previous frame by at least a predefined length of time, cause the one or more filters of the second set to operate on far-end samples selected from the buffer according to the first estimate of the delay and to, in response to determining that in respect of one or more speech frames a measure of convergence of the second set of filters exceeds a measure of convergence of the first set of filters by at least a first predefined threshold, update the operating delay using the first estimate of the delay.

2. The system as claimed in claim 1, wherein the predefined length of time comprises a measure of an extent of far-end samples over which the one or more filters of the first set are configured to operate.

3. The system as claimed in claim 2, wherein the extent of far-end samples comprises a time span between earliest and latest far-end samples of the time-series on which the one or more filters of the first set are configured to operate in respect of each speech frame.

4. The system as claimed in claim 1, wherein the first delay estimator is configured to form the first estimate of the delay by comparing an energy of the microphone signal during periods of speech with the far-end signal over a predetermined set of frequency bins.

5. The system as claimed in claim 4, wherein the first delay estimator is further configured to generate a binary representation of energy in each frequency bin for speech frames and frames carrying the far-end signals, and to form the first estimate of the delay by identifying for a speech frame a maximal correlation between a binary representation of the speech frame and binary representations of far-end frames held at a second buffer, wherein the first estimate of the delay is indicated by a position in the second buffer of a far-end frame at which a maximal correlation occurs.

6. The system as claimed in claim 4, wherein the first delay estimator is further configured to form short and long term energy estimates for each frequency bin of far-end and speech frames, wherein the binary representation of the far-end and speech frames in each frequency bin is further representative of a relative size of corresponding short term and long term energy estimates.

7. The system as claimed in claim 1, wherein the second delay estimator is configured to determine the operating delay in dependence on one or more estimates of the delay for one or more previous speech frames.

8. The system as claimed in claim 1, wherein an operating delay for the frame comprises the first estimate of the delay for a previous speech frame if a first estimate of the delay for the speech frame differs from the first estimate of the delay for the previous speech frame by less than the predefined length of time.

9. The system as claimed in claim 1, wherein the operating delay for the speech frame comprises the operating delay of a previous speech frame if the first estimate of the delay for the speech frame differs from the first estimate of the delay for the previous speech frame by more than the predefined length of time.

10. The system as claimed in claim 1, wherein the operating delay comprises the first estimate of the delay during initialisation of the first set of filters.

11. The system as claimed in claim 1, wherein the system is configured to provide the first estimate of the delay as the output estimate of the delay during initialisation of the first set of filters; and wherein the system is configured to provide a previous output estimate of the delay responsive to determining that the measure of convergence of the second set of filters exceeds the measure of convergence of the first set of filters by less than a second predefined threshold.

12. The system as claimed in claim 1, wherein the first set of filters comprises a plurality of filters and wherein the second delay estimator is configured to, for each of the plurality of filters, select from the buffer far-end samples centered about a respective predetermined offset from the operating delay and to operate one of the filters of the first set at the operating delay.

13. The system as claimed in claim 12, wherein the second delay estimator is further configured to identify the convergence of each of the filters of the first set and provide as a second estimate of the delay the offset operating delay at which a best converged filter of the first set operates.

14. The system as claimed in claim 1, wherein the controller is configured to determine the measures of convergence of the first and second sets of filters from, respectively, measures of convergence of best converged filters of the first and second sets of filters.

15. The system as claimed in claim 1, wherein each of the filters of the first and second sets are configured to form an estimate of the echo in the microphone signal from the far-end signal.

16. The system as claimed in claim 1, wherein the second set of filters comprise a plurality of filters and wherein the controller is further configured to, in response to determining that in respect of one or more speech frames a measure of convergence of the second set of filters exceeds a measure of convergence of the first set of filters by at least a first predefined threshold, identify the convergence of each of the second filters and update the operating delay for a next speech frame to be an offset operating delay at which a best converged filter of the second set operates.

17. The system as claimed in claim 1, wherein the controller is further configured to, in response to the determination, replace filter parameters of the filter of the first set which is configured to operate at the operating delay with filter parameters of a best converged filter of the second set.

18. A method for estimating delay between a far-end signal and an echo of the far-end signal in a microphone signal, the method comprising:

receiving a microphone signal;

storing, in a buffer, a time-series of far-end samples representing the far-end signal;

forming a first estimate of the delay in respect of a frame representing the microphone signal;

forming a second estimate of the delay for the frame by selecting far-end samples from the buffer in dependence on an operating delay and operating a first set of one or more filters on the selected far-end samples;

providing the second estimate of the delay for use as an output estimate of the delay; and updating the operating delay by:

operating a second set of one or more filters on far-end samples selected from the buffer according to the first estimate of the delay responsive to determining that the first estimate of the delay for a frame differs from an operating delay for a previous frame by at least a predefined length of time; and updating the operating delay using the first estimate of the delay responsive to determining that in respect of one or more frames a measure of convergence of the second set of filters exceeds a measure of convergence of the first set of filters by at least a first predefined threshold.

19. The method as claimed in claim 18, further comprising providing the second estimate of the delay as an output estimate of the delay by the system.

20. A non-transitory machine readable storage medium having stored thereon machine readable code that, when executed at a computer system, causes the computer system to:

receive a microphone signal;

store, in a buffer, a time-series of far-end samples representing a far-end signal in said microphone signal;

form a first estimate of delay between said far-end signal and an echo of said far-end signal in respect of a frame representing the microphone signal;

form a second estimate of said delay for the frame by selecting far-end samples from the buffer in dependence on an operating delay and operating a first set of one or more filters on the selected far-end samples;

providing the second estimate of the delay for use as an output estimate of the delay; and updating the operating delay by:

operating a second set of one or more filters on far-end samples selected from the buffer according to the first estimate of the delay responsive to determining that the first estimate of the delay for a frame differs from an operating delay for a previous frame by at least a predefined length of time; and updating the operating delay using the first estimate of the delay responsive to determining that in respect of one or more frames a measure of convergence of the second set of filters exceeds a measure of convergence of the first set of filters by at least a first predefined threshold.

* * * * *